(12) United States Patent
Miyake

(10) Patent No.: US 11,993,104 B2
(45) Date of Patent: May 28, 2024

(54) PNEUMATIC TIRE

(71) Applicant: TOYO TIRE CORPORATION, Itami (JP)

(72) Inventor: Masaya Miyake, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 475 days.

(21) Appl. No.: 17/114,749

(22) Filed: Dec. 8, 2020

(65) Prior Publication Data

US 2021/0178834 A1 Jun. 17, 2021

(30) Foreign Application Priority Data

Dec. 13, 2019 (JP) ................. 2019-225709

(51) Int. Cl.
*B60C 19/00* (2006.01)
*B60C 9/02* (2006.01)

(52) U.S. Cl.
CPC ............... *B60C 19/00* (2013.01); *B60C 9/02* (2013.01); *B60C 9/0207* (2013.01); *B60C 2019/008* (2013.01)

(58) Field of Classification Search
CPC ..... B60C 19/00; B60C 2019/008; B60C 9/02; B60C 9/0207
USPC ................... 152/450, 451, 548, 557
See application file for complete search history.

(56) References Cited

U.S. PATENT DOCUMENTS

| 2010/0024986 A1* | 2/2010 | Tatara ............... B29D 30/0061 |
| | | 156/397 |
| 2014/0230986 A1* | 8/2014 | Adachi ................ B29D 30/38 |
| | | 152/510 |
| 2016/0159167 A1 | 6/2016 | Tanno et al. |

FOREIGN PATENT DOCUMENTS

| DE | 11 2014 003 816 T5 | 5/2016 |
| JP | 2006027010 A * | 2/2006 |
| JP | 2008012769 A * | 1/2008 |
| JP | 2013230700 A * | 11/2013 |
| JP | 2017-109517 A | 6/2017 |
| JP | 2017109367 A * | 6/2017 |
| JP | 2017165075 A * | 9/2017 |

OTHER PUBLICATIONS

Fukase K, JP-2017109367-A, machine translation. (Year: 2017).*

(Continued)

*Primary Examiner* — Sedef E Paquette
(74) *Attorney, Agent, or Firm* — WHDA, LLP

(57) ABSTRACT

A pneumatic tire includes a tread portion, a pair of sidewall portions, a first ply, and a discontinuous second ply composed of a pair of ply pieces. The first ply has a central portion and a pair of first side portions extending from both ends of the central portion to the inner side in the tire radial direction. Each of the ply pieces has an inner end portion disposed on the outer side in the tire radial direction of the central portion and a second side portion extending from the inner end portion to the inner side in the tire radial direction. The first ply is provided with a plurality of ventilation holes, and the density of the ventilation holes in the central portion is higher than the density of the ventilation holes in the pair of first side portions.

8 Claims, 5 Drawing Sheets

(56) References Cited

OTHER PUBLICATIONS

Shida T, JP-2006027010-A, machine translation. (Year: 2006).*
Asada S, JP-2008012769-A, machine translation. (Year: 2008).*
Kuroki T, JP-2013230700-A, machine translation. (Year: 2013).*
Kishihata K, JP-2017165075-A, machine translation. (Year: 2017).*
Office Action dated Apr. 3, 2023, issued in counterpart German application No. 102020132256.9, with the English translation.

* cited by examiner

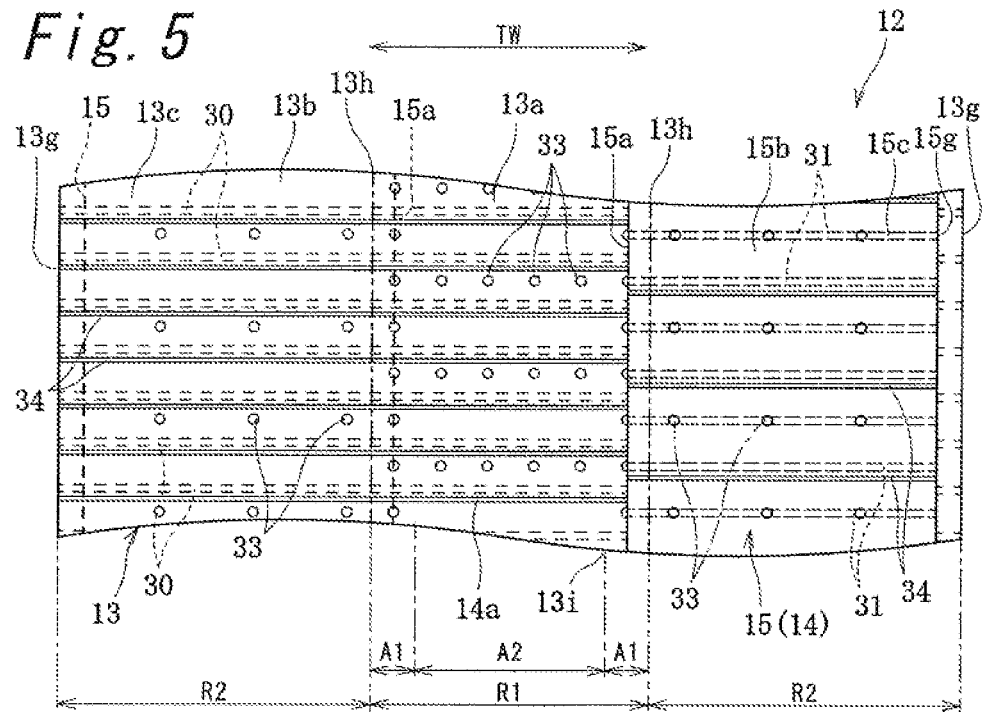
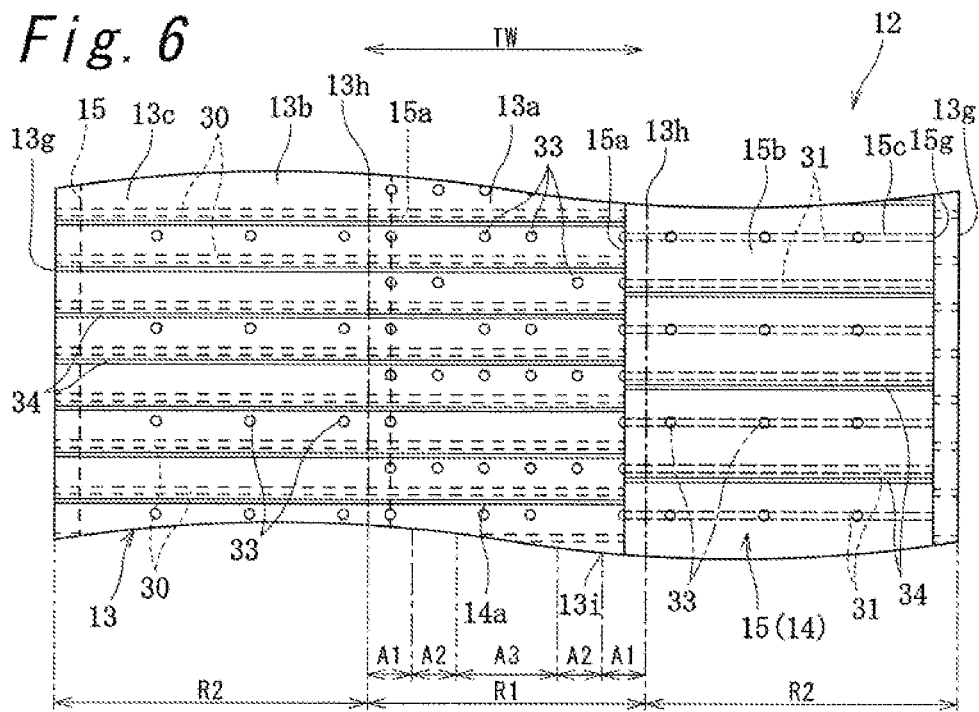

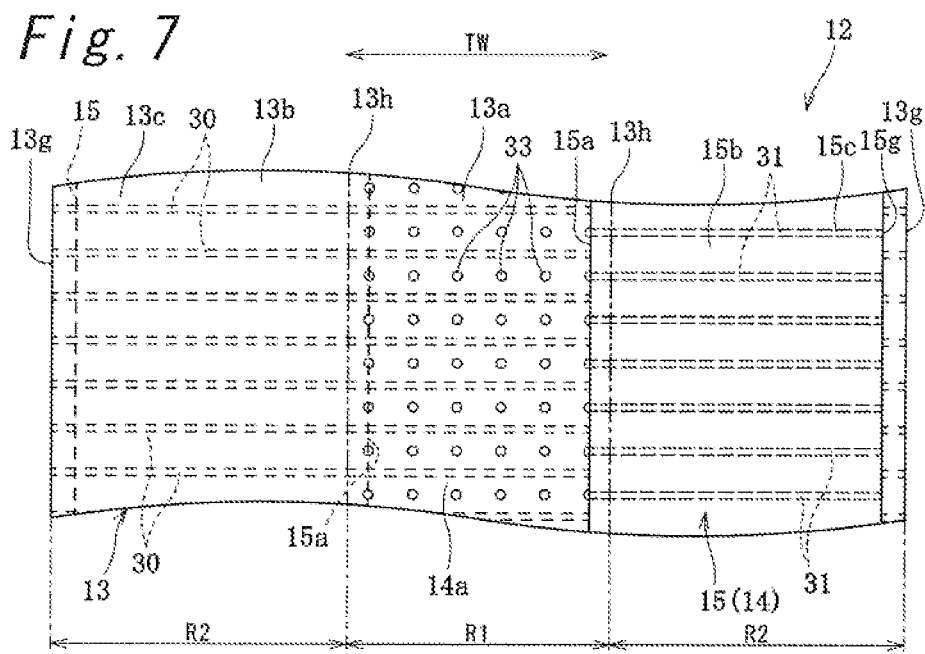

PNEUMATIC TIRE

CROSS-REFERENCE TO RELATED APPLICATIONS

This application claims priority of Japanese Patent Application No.: 2019-225709 filed on Dec. 13 2019, the content of which is incorporated herein by reference.

BACKGROUND OF THE INVENTION

Technical Field

The present invention relates to a pneumatic tire.

Related Art

A carcass ply of a pneumatic tire disclosed in JP 2017-109517 A includes a first ply that is continuous between a pair of bead portions and a discontinuous second ply that is disposed on the outer side in the tire radial direction of the first ply. The second ply includes a pair of ply pieces respectively extending from a tread portion to any one of a pair of sidewall portions. In the center of the tread portion, more specifically between inner end portions of the pair of ply pieces, a region where neither of two ply pieces exists, that is, a hollow portion is provided.

SUMMARY

Since a region in which the ply piece does not exist is formed between the inner end portions of the pair of ply pieces, there is a possibility that air entry in which air enters and remain in the hollow portion of the second ply may occur. No consideration is given to Patent Literature 1 regarding the air entry into the hollow portion.

An object of the present invention is to suppress air entry into a hollow portion in a pneumatic tire including a carcass ply having the hollow portion.

One aspect of the present invention provides a pneumatic tire including: a tread portion; a pair of sidewall portions extending from both ends of the tread portion to an inner side in a tire radial direction; a first ply including a central portion positioned on the inner side in the tire radial direction of the tread portion and a pair of first side portions extending from both ends of the central portion to the inner side in the tire radial direction and positioned on an inner side in a tire width direction of the sidewall portion; and a discontinuous second ply including a pair of ply pieces, each of the pair of ply pieces having an inner end portion that is disposed on an outer side in the tire radial direction of the central portion in the tread portion and a second side portion that extends from the inner end portion to the inner side in the tire radial direction and is positioned on an outer side in the tire width direction of one of the pair of first side portions. The first ply is provided with a plurality of ventilation holes, and a density of the ventilation holes in the central portion is higher than a density of the ventilation holes in the pair of first side portions.

The second ply includes the pair of ply pieces and is discontinuous. That is, between respective inner end portions of the pair of ply pieces, there is a hollow portion in which no ply piece exists. By employing the second ply having the hollow portion, weight reduction and reduction in rolling resistance due to the weight reduction can be achieved as compared with the case where the second ply is one continuous ply. Further, since the first ply and the second ply include the side portions positioned on the inner side in the tire width direction of the sidewall portion, the rigidity of the sidewall portion and the steering stability and cut resistance due to the rigidity can be ensured.

Most of air existing in the hollow portion is pushed out by the pressure welding of the tire components performed during the molding of the pneumatic tire (green tire). A plurality of the ventilation holes are formed in the first ply, and the density of the ventilation holes in the central portion adjacent on the inner side in the tire radial direction to the hollow portion is higher than the density of the ventilation holes in the first side portion. That is, the ventilation holes (space) through which air can escape are scattered in the central portion of the first ply adjacent on the inner side in the tire radial direction to the hollow portion. Therefore, air that cannot be completely discharged by the pressure welding is dispersed in a plurality of the ventilation holes, and is not concentrated or interposed between the first ply and the facing member. Therefore, it is possible to significantly suppress the local air entry into the hollow portion.

The density of the ventilation holes of the pair of first side portions includes zero. The pair of first side portions may have no ventilation holes.

That is, the present aspect includes a configuration in which the ventilation hole is not formed in the first side portion of the first ply. Therefore, it is possible to prevent the rigidity of the first side portion from being lowered due to the formation of the ventilation holes. As a result, it is possible to ensure the rigidity of the sidewall portion and the steering stability and cut resistance due to the rigidity.

The central portion includes a pair of first regions respectively being adjacent on the inner side in the tire radial direction to respective inner end portions of the pair of ply pieces and a second region adjacent on the inner side in the tire width direction to the pair of first regions, and the density of the ventilation holes in the pair of first regions is higher than the density of the ventilation holes in the second region. The density of the ventilation holes in the pair of first regions may be 100 or more and 300 or less per one square meter, and the density of the ventilation holes in the second region may be 0 or more and 200 or less per one square meter. The density of the ventilation holes in the second region may be higher than the density of the ventilation holes in the pair of first side portions.

In the present aspect, the density of the ventilation holes in the first region where air entry is likely to occur due to a step formed by the inner end portion of the ply piece and the first ply is set to be higher than the density of the ventilation holes in the second region where air entry is less likely to occur than in the first region. Therefore, it is possible to suppress the air entry into the hollow portion, and to prevent the rigidity of the tread portion from being lowered due to excessive formation of the ventilation holes.

The central portion includes a pair of first regions respectively being adjacent on the inner side in the tire radial direction to respective inner end portions of the pair of ply pieces, a pair of second regions respectively being adjacent on the inner side in the tire width direction to the pair of first regions, and a third region adjacent on the inner side in the tire width direction to the pair of second regions, and the density of the ventilation holes is increasing in order of the pair of second regions, the third region, and the pair of first regions. The density of the ventilation holes in the pair of first regions may be 100 or more and 300 or less per one square meter, the density of the ventilation holes in the pair of second regions may be 0 or more and 200 or less per one square meter, and the density of the ventilation holes in the third region may be 50 or more and 250 or less per one square meter. The density of the ventilation holes in the pair of second regions may be higher than the density of the ventilation holes in the pair of first side portions.

According to the present aspect, the density of the ventilation holes in the first region where air entry is likely to occur due to a step formed by the inner end portion of the ply piece and the first ply is set to be higher than the density of the ventilation holes in the second region and the third region where air entry is less likely to occur than in the first region. Therefore, it is possible to suppress the air entry in the vicinity of the inner end portion of the ply piece, and to prevent the rigidity of the tread portion from being lowered due to excessive formation of the ventilation holes.

Further, in a case where the tire components are pressurized by the pressure roller having a both ends supported structure during the molding of a green tire, the pressure at the center of the pressure roller is smaller than the pressure at both ends. In contrast, in the present aspect, the density of the ventilation holes in the third region positioned at the center of the pressure roller is made higher than the density of the ventilation holes in the second region. Therefore, it is possible to suppress the interposition of air, that is, the air entry between the third region of the first ply and the facing member.

The first region has a width from a first portion closer to the inner side in the tire width direction than the inner end portion to a second portion closer to the outer side in the tire width direction than the inner end portion in the central portion, and the width of the first region is larger than 0 mm and 50 mm or less.

In the present aspect, air entry in the vicinity of the inner end portion of the ply piece can be effectively suppressed.

A bleeder cord composed of a plurality of fibers is disposed on a surface of the first ply and a surface of the second ply, and the density of the bleeder cord disposed on the first ply is higher than the density of the bleeder cord disposed on the second ply.

In the present aspect, even if unintended air entry occurs, air can be dispersed through a gap between the fibers constituting the bleeder cord. Therefore, it is possible to effectively suppress a problem caused by local air entry.

In the present invention, air entry into a hollow portion in a pneumatic tire including a carcass ply having the hollow portion can be suppressed.

BRIEF DESCRIPTION OF THE DRAWINGS

The foregoing and the other features of the present invention will become apparent from the following description and drawings of an illustrative embodiment of the invention in which:

FIG. 5 is a development view of the first ply and the second ply in a second embodiment;

FIG. 6 is a development view of the first ply and the second ply in a third embodiment; and FIG. 7 is a development view of the first ply and the second ply in a variation.

DETAILED DESCRIPTION OF EMBODIMENTS

Hereinafter, an embodiment of the present invention will be described with reference to the drawings.

First Embodiment

Figure 1:
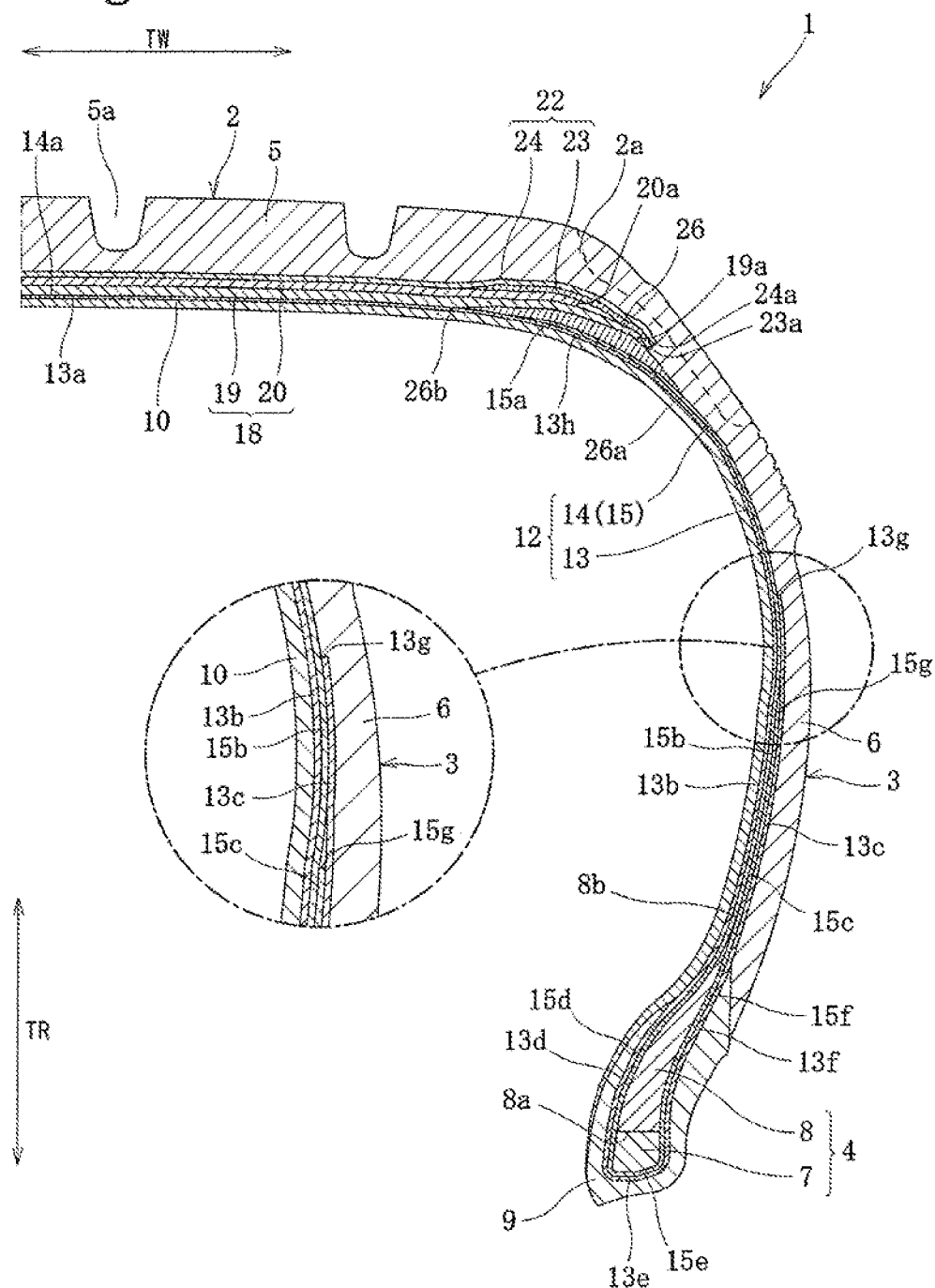
FIG. 1 is a meridian cross-sectional view of a pneumatic tire according to a first embodiment of the present invention.
Figure 2:
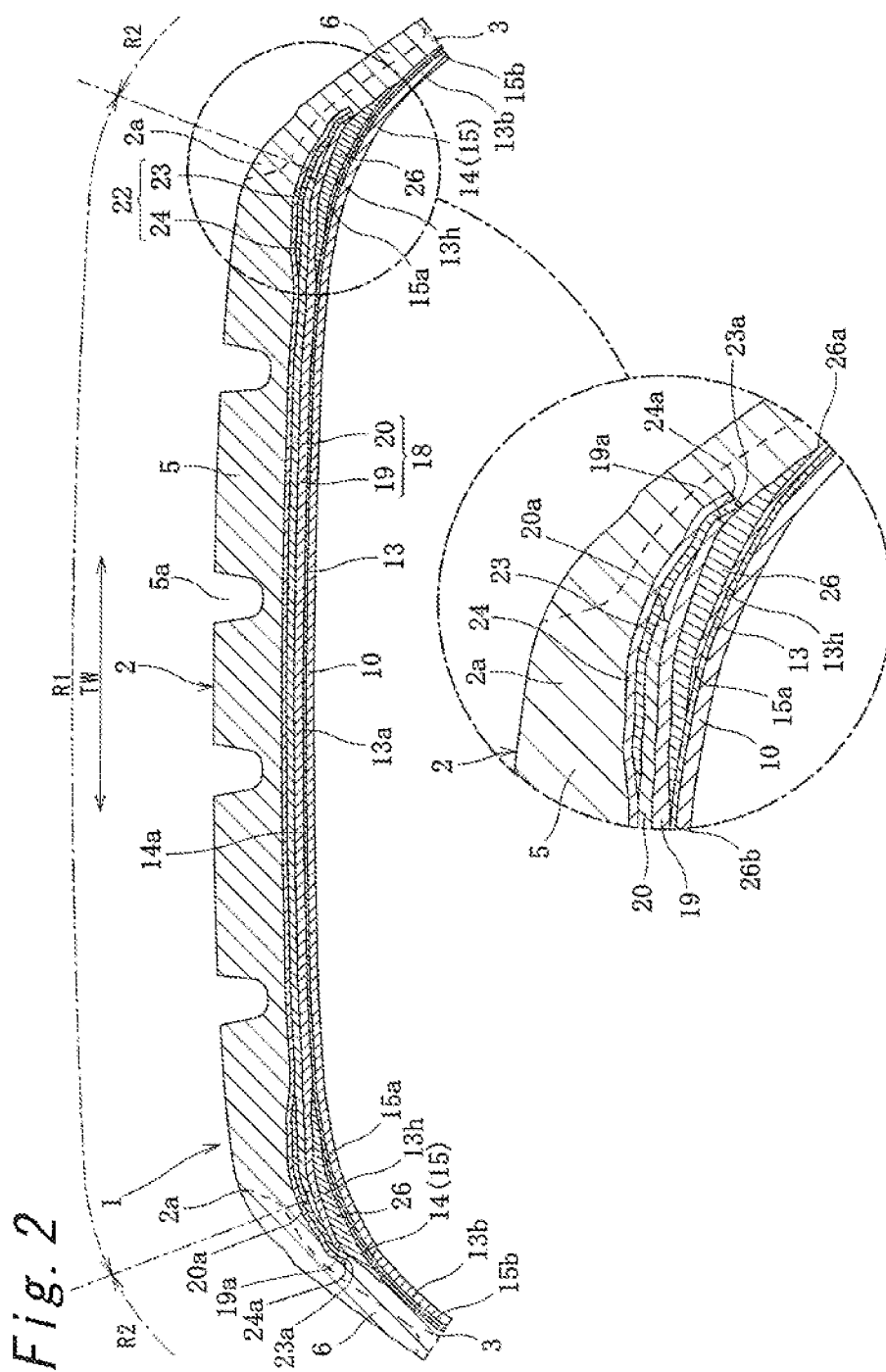
FIG. 2 is a meridian cross-sectional view of a tread portion and its vicinity of the pneumatic tire according to the first embodiment of the present invention.

FIGS. 1 and 2 show a pneumatic tire (hereinafter referred to as tire) 1 made from rubber according to a first embodiment of the present invention. The tire 1 includes a tread portion 2, a pair of sidewall portions 3, and a pair of ring-shaped bead portions 4.

The tread portion 2 includes tread rubber 5 extending in the tire width direction (indicated by the reference numeral TW in FIG. 1). A groove 5a is provided on the surface, that is, the tread surface of the tread rubber 5.

Each of the pair of sidewall portions 3 includes side rubber 6 extending from each of both ends of the tread portion 2 to the inner side in the tire radial direction (reference numeral TR in FIG. 1).

The pair of bead portions 4 are respectively disposed in end portions on the inner side in the tire radial direction of the pair of sidewall portions 3. Each of the bead portions 4 includes a bead core 7 and a bead filler 8. The bead core 7 includes a large number of steel wires bundled in a ring shape. The bead filler 8 has a ring shape and is made from rubber that is harder than rubber that constitutes the tread portion 2 and the sidewall portion 3. The bead filler 8 includes a base end 8a disposed adjacent to the outer side in the tire radial direction of the bead core 7 and a tip end 8b on the side opposite to the base end 8a, and extends in a tapered shape from the base end 8a to the outer side in the tire radial direction toward the tip end 8b. Each of the bead portions 4 includes strip rubber 9 provided to wrap the bead core 7 and the bead filler 8.

The tire 1 includes a carcass 12 laid over between the bead portions 4 in a toroidal shape. In the present embodiment, the carcass 12 includes a first carcass ply (hereinafter, referred to as "first ply") 13 and a second carcass ply (hereinafter, referred to as "second ply") 14. The second ply 14 is a ply having a hollow portion 14a, while the first ply 13 is a normal ply having no hollow portion. The first ply 11 and the second ply 12 will be described in detail later. An inner liner 10 is provided on the inner side of the carcass 12, that is, on the innermost peripheral surface of the tire 1.

With reference to FIG. 2, an endless belt layer 18 is provided on the tread portion 2, more specifically, between the carcass 12 and the tread rubber 5. In the present embodiment, the belt layer 18 includes two belts 19 and 20. The belt 19 is disposed adjacent to the outer side in the tire radial direction of the carcass 12, and the belt 20 is disposed adjacent to the outer side in the tire radial direction of the belt 19. Further, the dimension in the tire width direction of the belt 19 in the lower layer is larger than the dimension in the tire width direction of the belt 20 in the upper layer, and an end portion 19a of the belt 19 is positioned closer to the outer side in the tire width direction than an end portion 20a of the belt 20. The belts 19 and 20 are formed by covering a belt cord made from steel or organic fiber with rubber. The belt layer 18 may be composed of one belt, or may include three or more belts.

An endless cap layer 22 is provided adjacent to the outer side in the tire radial direction of the belt layer 18. The cap layer 22 includes a pair of narrow edge plies 23 that directly cover either of the end portions 19a and 20a of the belts 19 and 20. The cap layer 22 of the present embodiment includes a wide cap ply 24 that is disposed adjacent to the outer side in the tire radial direction of the edge ply 23 and 24 that covers the entire belts 19 and 20 including the end portions 19a and 20a as a single sheet. The cap layer 22 may include one or three or more plies. Further, the cap layer 22 may be eliminated.

A pair of endless pads 26 made from rubber are respectively disposed between both ends on the outer side in the tire width direction of the belt layer 18 and the carcass 12. The cross-sectional shape of the pad 26 is a flat triangular shape. The positions in the tire width direction of the end portions 19a and 20a of the belts 19 and 20, the end portion 23a on the outer side in the tire width direction of the edge ply 23, and an end portion 24a of the cap ply 24 are set in a region between an end portion 26a on the outer side in the tire width direction of the pad 26 and an end portion 26b on the inner side, that is, a region where the pad 26 exists. The pad 26 may be eliminated.

Hereinafter, the first ply 13 and the second ply 14 constituting the carcass 12 will be described.

Figure 3:
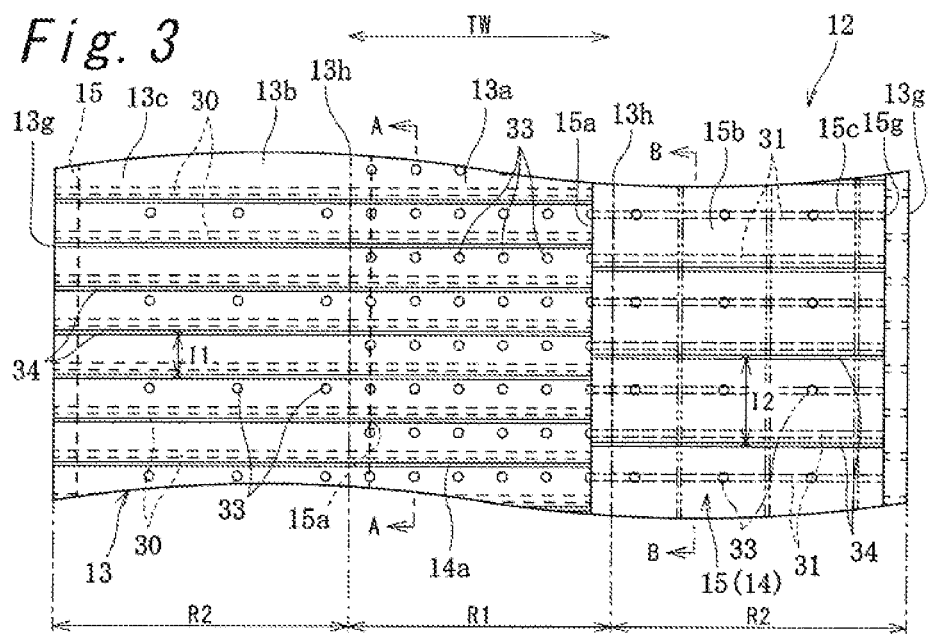
FIG. 3 is a development view of a first ply and a second ply in the first embodiment.

As shown in FIGS. 1 and 2, the first ply 13 is a single ply, while the second ply 14 is a discontinuous ply having the hollow portion 14a as described above. The second ply 14 is composed of a pair of ply pieces 15. Referring to FIG. 3, all of the first ply 13 and the ply pieces 15 of the second ply 14 are a strip-shaped sheet in which a plurality of cords 30 and 31 arranged in parallel at intervals are covered with rubber.

As shown in FIGS. 1 and 2, the first ply 13 includes a central portion 13a positioned on the inner side in the tire radial direction of the tread portion 2, and a pair of side portions (first side portions) 13b extending from both ends in the tire width direction of the central portion 13a to the inner side in the tire radial direction. Further, the first ply 13 includes a wind-up portion 13c that is provided continuously with the side portion 13b and wound up from the inner side to the outer side in the tire width direction with respect to the bead portion 4.

The central portion 13a is disposed adjacent to the outer side in the tire radial direction of the inner liner 10 in the tread portion 2.

The side portion 13b is provided continuously with the central portion 13a, and is disposed adjacent to the outer side in the tire width direction of the inner liner 10 in the sidewall portion 3.

The wind-up portion 13c is terminated in the sidewall portion 3. More specifically, the wind-up portion 13c includes an inner portion 13d, a winding portion 13e, and an outer portion 13f. The inner portion 13d is disposed closer to the inner side in the tire width direction than the bead portion 4, that is, the bead core 7 and the bead filler 8, with the ply piece 15 interposed between them. The winding portion 13e is provided continuously with the inner portion 13d, and is wound around the bead core 7 with the ply piece 15 interposed between them. The outer portion 13f is provided continuously with the winding portion 13e, and is disposed closer to the outer side in the tire width direction than the bead portion 4 with the ply piece 15 interposed between them. An end portion of the outer portion 13f constitutes an end portion 13g of the first ply 13. The end portion 13g is positioned closer to the outer side in the tire radial direction than the tip end 8b of the bead filler 8 and is positioned closer to the inner side in the tire radial direction than the tread portion 2.

The second ply 14 is disposed adjacent on a tire outer surface side with respect to the first ply 13, and is a discontinuous ply composed of the pair of ply pieces 15. The ply piece 15 has an inner end portion 15a disposed between the belt layer 18 and the central portion 13a of the first ply 13. The pad 26 is interposed between the inner end portion 15a and the belt layer 18.

The position in the tire width direction of the inner end portion 15a of the ply piece 15 is set in the region on the outer side in the tire width direction of the tread portion 2, more specifically, in the region closer to the inner side in the tire width direction to both the end portions 19a and 20a of the belts 19 and 20 constituting the belt layer 18. The hollow portion 14a is provided in the region at the center in the tire width direction of the tread portion 2, more specifically, in the region between the inner end portions 15a of the pair of ply pieces 15. In the hollow portion 14a, the second ply 14 does not exist, and only the central portion 13a of the first ply 13 exists.

The ply piece 15 includes a side portion (second side portion) 15b extending to the inner side in the tire radial direction from the inner end portion 15a, and a wind-up portion 15c wound up from the inner side to the outer side in the tire width direction with respect to the bead core 7.

The side portion 15b is disposed adjacent to the outer side in the tire width direction of the side portion 13b of the first ply 13 in the sidewall portion 3.

The wind-up portion 15c is provided continuously with the side portion 15b and is terminated in the sidewall portion 3. The wind-up portion 15c includes an inner portion 15d, a winding portion 15e, and an outer portion 15f. The inner portion 15d is disposed on the inner side in the tire width direction of the bead portion 4, more specifically, between the bead portion 4 and the inner portion 13d of the first ply 13. The winding portion 15e is provided continuously with the inner portion 15d and is wound around the bead core 7. More specifically, the winding portion 15e is disposed between the bead core 7 and the winding portion 13e of the first ply 13. The outer portion 15f is provided continuously with the winding portion 15e, and is disposed closer to the outer side in the tire width direction than the bead portion 4. Of the outer portion 15f, a part positioned on the inner side in the tire radial direction is disposed so as to overlap the outer side in the tire width direction of the bead portion 4, and the rest is disposed so as to overlap the outer side in the tire width direction of the side portion 15b. An end portion of the outer portion 15f constitutes an outer end portion 15g of the ply piece 15. The outer end portion 15g is positioned closer to the outer side in the tire radial direction than the tip end 8b of the bead filler 8 and is positioned closer to the inner side in the tire radial direction than the tread portion 2, more specifically, the end portion 13g of the first ply 13.

In a case where the second ply 14 includes the hollow portion 14a, a region where the ply piece 15 does not exist is formed between the pair of inner end portions 15a, so that air entry in which air enters the region (hollow portion 14a) may occur.

Figure 4A:
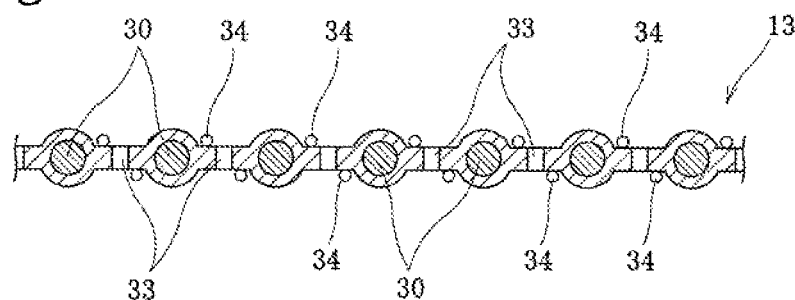
FIG. 4A is a cross-sectional view taken along line A-A of FIG. 3.
Figure 4B:
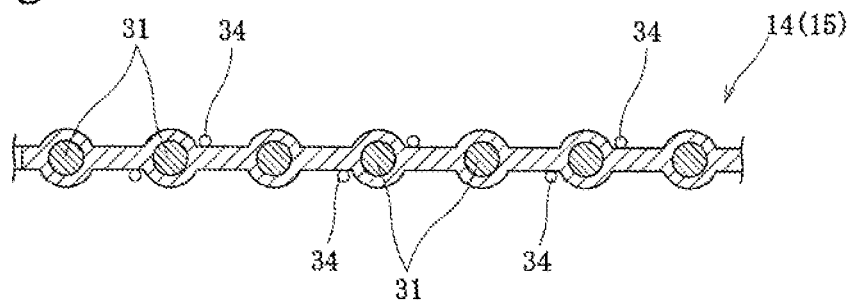
FIG. 4B is a sectional view taken along line B-B in the second ply of FIG. 3.

In the present embodiment, as shown in FIG. 3, the first ply 13 is provided with a plurality of ventilation holes 33 in order to suppress air entry into the hollow portion 14a. Further, as shown in FIGS. 4A and 4B, bleeder cords 34 are respectively disposed on a surface of the first ply 13 and a surface of the second ply 14. The ply piece 15 of the second ply 14 is not provided with the ventilation hole. FIG. 3 shows a developed state of the carcass 12 of the first embodiment, and in FIG. 3 the ply piece 15 on left side is omitted and only the inner end portion 15a thereof is shown by a dotted line. FIG. 4A shows a cross-sectional view taken along line A-A of FIG. 3, and FIG. 4B shows a sectional view taken along line B-B of only the second ply 14 in FIG. 3. These diagrams are exaggerated to clearly show the ventilation holes 33 and the bleeder cord 34.

As shown by a broken line in FIGS. 3 and 4A, a plurality of the cords 30 are embedded in the first ply 13 at intervals in the tire circumferential direction (vertical direction in FIG. 3). The individual cords 30 extend in the tire width direction TW in the tread portion 2 and extend in the tire radial direction in the sidewall portion 3. With reference to FIGS. 3 and 4B, a plurality of the cords 31 are arranged side by side on the ply piece 15 of the second ply 14. The individual cords 31 extend parallel to the cords 30 and are disposed at intervals in the tire circumferential direction. All of the cords 30 and 31 are disposed at intervals of 0.1 mm or more and 3 mm or less. The diameter of the individual cords 30 and 31 is approximately 0.6 mm.

The ventilation hole 33 is a through-hole penetrating from one surface to the other surface of the first ply 13, and is provided so as to avoid the cord 30. The diameter of the ventilation hole 33 is less than the interval between adjacent ones of the cords 30. For example, the ventilation holes 33 are formed with a diameter of about 1 mm by a large number of needles disposed on a roller that sends out the first ply 13 during forming of a green tire before vulcanization. By changing the number of needles to be disposed depending on a portion of a delivery roller, the density of the ventilation holes 33 can be changed depending on a portion of the first ply 13 in the width direction.

In the present embodiment, the density of the ventilation holes 33 formed in the central portion 13a and the density of the ventilation holes 33 formed in the side portions 13b are different. Further, the wind-up portion 13c connected to the side portion 13b is provided with the ventilation hole 33 as in the side portion 13b. Note that it is not necessary to provide the ventilation hole 33 in the wind-up portion 13c.

As shown in FIG. 2, the central portion 13a of the present embodiment is between a pair of shoulder portions 2a positioned on the outer side in the tire width direction of the tread portion 2, more specifically, a range R1 in the tire width direction between the pair of pads 26. In the tire width direction, an outer end 13h of the central portion 13a is positioned closer to the outer side than the inner end portion 15a of the ply piece 15. A range R2 from the outer end 13h of the central portion 13a to the end portion 13g constitutes the side portion 13b including the wind-up portion 13c. Among them, the side portion 13b is a range from the outer end 13h of the central portion 13b to the tip end 8b of the bead filler 8.

As most clearly shown in FIG. 3, the density of the ventilation holes 33 formed in the central portion 13a is higher than the density of the ventilation holes 33 formed in the side portion 13b including the wind-up portion 13c. That is, the number of the ventilation holes 33 per unit area (one square meter) formed in the first range R1 of the first ply 13 is larger than the number of the ventilation holes 33 per unit area formed in the second range R2 of the first ply 13.

For example, the first range R1 of the first ply 13 is provided with 50 or more and 300 or less of the ventilation holes 33 per unit area (one square meter). On the other hand, the second range R2 of the first ply 13 is provided with 0 or more and 250 or less of the ventilation holes 33 per unit area. That is, the side portion 13b including the wind-up portion 13c includes a configuration in which the ventilation holes 33 are not formed, that is, a configuration in which the density of the ventilation holes 33 is zero (see FIG. 7). In the present embodiment, the first range R1 of the first ply 13 is provided with the ventilation holes 33 in a matrix shape at intervals of 5 mm or more and 50 mm or less. The second range R2 of the first ply 13 is provided with the ventilation holes 33 in a matrix shape at intervals of 20 mm or more and 100 mm or less.

Subsequently referring to FIGS. 3 and 4A, the bleeder cord 34 is respectively provided on an inner surface positioned on the inner side in the tire radial direction and an outer surface positioned on the outer side in the tire radial direction in the first ply 13. The bleeder cord 34 of the first ply 13 extends in the tire width direction in the tread portion 2 and extends in the tire radial direction in the sidewall portion 3. Referring to FIGS. 3 and 4B, in the second ply 14, the bleeder cord 34 is respectively provided on an inner surface positioned on the inner side in the tire radial direction and an outer surface positioned on the outer side in the tire radial direction like in the first ply 13, and extends in the tire radial direction in the sidewall portion 3. The bleeder cord 34 is composed of a plurality of fibers such as cotton yarn and polyester yarn, and has a function of reducing local air entry by allowing air to pass through. The diameter of each of the bleeder cords 34 is approximately 0.1 mm.

As most clearly shown in FIG. 3, the density of the bleeder cord 34 disposed on the first ply 13 is higher than the density of the bleeder cord 34 disposed on the second ply 14. That is, an interval I1 of the bleeder code 34 disposed in the first ply 13 and an interval I2 of the bleeder code 34 disposed in the second ply 14 are different, and the interval I1 is smaller than the interval I2. In the present embodiment, each of the bleeder cords 34 of the first ply 13 is disposed between the ventilation holes 33 adjacent to each other in the tire circumferential direction so as to extend along the cord 30. The bleeder cords 34 of the second ply 14 are disposed every other one of spaces between the cords 31 adjacent to each other in the tire circumferential direction so as to extend along the cord 31.

Here, a green tire before vulcanization constituting the pneumatic tire 1 is formed into a cylindrical shape by laminating a plurality of the tire components described above on a forming drum in a predetermined order. By pressurizing the laminated tire components with pressure contact members, most of air existing between the members can be pushed out. For example, a pressure roller having a both ends supported structure is used to pressurize a member having a wide width in the tire width direction such as the first ply 13, the second ply 14 composed of the pair of ply pieces 15, and the belt 19.

The pressure welding of the ply piece 15 by the pressure roller pushes out most of air existing between the first ply 13 and the second ply 14. The pressure welding of the belt 19 by the pressure roller pushes out most of air existing in the hollow portion 14a. At this time, the ventilation holes 33 formed in the first ply 13 function as space for air to escape. Therefore, air that cannot be completely discharged by the pressure welding is dispersed in a plurality of the ventilation holes 33, and is not concentrated or interposed between the first ply 13 and the facing members 15 and 19.

The pneumatic tire 1 configured as described above has a feature described below.

The second ply 14 includes the pair of ply pieces 15 and is discontinuous. That is, between the inner end portions 15a of the pair of ply pieces 15, there is the hollow portion 14a in which no ply exists. By employing the second ply 14 having the hollow portion 14a, weight reduction and reduction in rolling resistance due to the weight reduction can be achieved as compared with the case where the second ply 14 is one continuous ply. Further, since the first ply 13 and the second ply 14 include the side portions 13*b* and 15*b* positioned on the inner side in the tire width direction of the sidewall portion 3, the rigidity of the sidewall portion 3 and the steering stability and cut resistance due to the rigidity can be ensured.

A plurality of the ventilation holes 33 are formed in the first ply 13, and the density of the ventilation holes 33 in the central portion 13*a* is higher than the density of the ventilation holes 33 in the side portion 13*b*. Therefore, it is possible to significantly suppress air entry into the hollow portion 14*a* while ensuring the rigidity of the sidewall portion 3 and the steering stability and cut resistance due to the rigidity.

The density of the ventilation holes 33 of the pair of side portions 13*b* includes zero. Therefore, since it is possible to prevent the rigidity of the side portion 13*b* from being lowered due to the formation of the ventilation holes 33, it is possible to ensure the rigidity of the sidewall portion 3 and the steering stability and cut resistance due to the rigidity.

The bleeder cord 34 composed of a plurality of fibers is disposed on the surface of the first ply 13 and the surface of the second ply 14, and the density of the bleeder cord 34 of the first ply 13 is higher than the density of the bleeder cord 34 of the second ply 14. Therefore, even if unintended local air entry occurs, air can be dispersed through a gap between the fibers constituting the bleeder cord 34. As a result, it is possible to effectively suppress a problem caused by local air entry.

Second Embodiment

FIG. 5 shows a state in which the carcass 12 of the pneumatic tire 1 according to a second embodiment is developed. The second embodiment is different from the first embodiment in that the central portion 13*a* of the first ply 13 is divided into two types and three locations of regions A1 and A2, and the densities of the ventilation holes 33 formed in these regions are made different from each other.

Specifically, the central portion 13*a* includes a pair of first regions A1 and one second region A2. The ventilation holes 33 are formed in each of the regions A1 and A2, and the density of the ventilation holes 33 formed in the first region A1 is higher than the density of the ventilation holes 33 formed in the second region A2. The density of the ventilation holes 33 formed in the second region A2 is higher than the density of the ventilation holes 33 formed in the side portion 13*b*.

Each of the first regions A1 is adjacent to the inner side in the tire radial direction of the inner end portion 15*a* of each of the ply pieces 15. More specifically, the first region A1 has in the central portion 13*a* a width from a first portion 13*i* positioned closer to the inner side in the tire width direction than the inner end portion 15*a* to the outer end (second portion) 13*h* closer to the outer side in the tire width direction than the inner end portion 15*a*. In the present embodiment, the first portion 13*i* and the second portion 13*h* of the first region A1 are symmetrically positioned about the inner end portion 15*a* of the ply piece 15.

The width of the first region A1 from the first portion 13*i* to the second portion 13*h* is preferably set in the range of more than 0 mm (that is, not including 0 mm) and 50 mm or less, and more preferably set in the range of 5 mm or more and 30 mm or less. In a case where the width of the first region A1 is excessively widened, the number of the ventilation holes 33 formed in the central portion 13*a* becomes excessive, and it becomes difficult to ensure the rigidity of the tread portion 2. In order to prevent such inconvenience, the width of the first region A1 is preferably set within the above range.

The second region A2 is adjacent to the inner side in the tire width direction of each of the pair of first regions A1. The second region A2 is a range from one of the first portions 13*i* to the other one of the first portions 13*i* of the pair of first regions A1.

In each of the pair of first regions A1, 100 or more and 300 or less of the ventilation holes 33 are formed per unit area (one square meter). In the second region A2, 0 or more and 200 or less of the ventilation holes 33 are formed per unit area.

In the pneumatic tire 1 of the second embodiment, the density of the ventilation holes 33 in the first region A1 where air entry is likely to occur due to the step is set to be higher than the density of the ventilation holes 33 in the second region A2 where air entry is less likely to occur than in the first region A1. Therefore, it is possible to effectively suppress the air entry in the vicinity of the inner end portion 15*a* of the ply piece 15, and to prevent the rigidity of the tread portion 2 from being lowered due to excessive formation of the ventilation holes 33.

Third Embodiment

FIG. 6 shows a state in which the carcass 12 of the pneumatic tire 1 according to a third embodiment is developed. The third embodiment is different from the first embodiment in that the central portion 13*a* of the first ply 13 is divided into three types and five locations of regions A1, A2 and A3, and the densities of the ventilation holes 33 formed in these regions are made different from each other.

Specifically, the central portion 13*a* includes a pair of first regions A1, a pair of second regions A2, and one third region A3. The ventilation holes 33 are formed in each of the regions A1, A2 and A3, and the density of the ventilation holes 33 is increasing in the order of the second region A2, the third region A3, and the first region A1. That is, the density of the ventilation holes 33 in the first region A1 is the highest, and the density of the ventilation holes 33 in the second region A2 is the lowest. The density of the ventilation holes 33 formed in the second region A2 is higher than the density of the ventilation holes 33 formed in the side portion 13*b*.

Each of the first regions A1 is adjacent to the inner side in the tire radial direction of the inner end portion 15*a* of each of the ply pieces 15. The range of the first region A1 is similar to that of the second embodiment. Each of the second region A2 is adjacent to the inner side in the tire width direction of each of the pair of first regions A1. The third region A3 is adjacent to the inner side in the tire width direction of each of the pair of second regions A2.

The width of the third region A3 is preferably set in the range of 50 mm or more and 200 mm or less, and more preferably set in the range of 100 mm or more and 150 mm or less. The center of this range is the center of the central portion 13*a* in the tire width direction. In the case of a pressure roller having a both ends supported structure, the pressing force at the center is smaller than the pressing force at both ends. Accordingly, if the width of the third region A3 corresponding to the central part is made too small, it is possible that the air is not pushed out sufficiently. If the width of the third region A3 is excessively large, the number of the ventilation holes 33 becomes excessive, and it becomes difficult to ensure the rigidity of the tread portion 2. In order to prevent these inconveniences, the width of the third region A3 is preferably set within the above range.

In each of the pair of first regions A1, 100 or more and 300 or less of the ventilation holes 33 are formed per unit area (one square meter). In each of the pair of second regions A2, 0 or more and 200 or less of the ventilation holes 33 are formed per unit area. In the third region A3, 50 or more and 250 or less of the ventilation holes 33 are formed per unit area.

In the pneumatic tire 1 of the third embodiment, the density of the ventilation holes 33 in the first region A1 where air entry is likely to occur due to the step formed by the inner end portion 15a of the ply piece 15 and the first ply 13 is set to be higher than the density of the ventilation holes 33 in the second region A2 and the third region A3 where air entry is less likely to occur than in the first region A1. Therefore, it is possible to suppress the air entry in the vicinity of the inner end portion 15a of the ply piece 15, and to prevent the rigidity of the tread portion from being lowered due to excessive formation of the ventilation holes 33.

Further, the density of the ventilation holes 33 in the third region A3 positioned at the center of the pressure roller having a both ends supported structure is made higher than the density of the ventilation holes 33 in the second regions A2 positioned on both sides of the third region A3. Therefore, it is possible to suppress the interposition of air, that is, the air entry between the third region A3 of the first ply 13 and the belt (facing member) 19.

Note that the pneumatic tire 1 of the present invention is not limited to the configuration of the above embodiment, and various changes can be made.

For example, the number and arrangement of the ventilation holes 33 can be changed as needed. Further, the density of the ventilation holes 33 formed in the central portion 13a may be gradually increased from the center to the outer side in the tire width direction (in multiple stages).

As shown in FIG. 7, as the first ply 13 and the second ply 14, plies on which the bleeder cord 34 is not disposed on the surface may be used. Further, the side portion 13b including the wind-up portion 13c does not have to be provided with the ventilation hole 33.

In addition to the first ply 13 and the second ply 14, a ply having the hollow portion 14a similar to that of the second ply 14 and/or a normal ply similar to the first ply 13 may be further included.

What is claimed is:

1. A pneumatic tire comprising:
a tread portion;
a pair of sidewall portions extending from both ends of the tread portion to an inner side in a tire radial direction;
a first ply including a central portion positioned on the inner side in the tire radial direction of the tread portion and a pair of first side portions, each of the pair of first side portions extending from respective ends of the central portion to the inner side in the tire radial direction and positioned on an inner side in a tire width direction of a respective one of the pair of sidewall portions; and
a discontinuous second ply including a pair of ply pieces, each of the ply pieces having an inner end portion that is disposed on an outer side in the tire radial direction of the central portion in the tread portion and a second side portion that extends from the inner end portion to the inner side in the tire radial direction and is positioned on an outer side in the tire width direction of one of the pair of first side portions, wherein
the first ply is provided with a plurality of ventilation holes,
a density of the ventilation holes in the central portion is higher than a density of the ventilation holes in the pair of first side portions,
the central portion includes a pair of first regions respectively being adjacent on the inner side in the tire radial direction to respective inner end portions of the pair of ply pieces and a second region adjacent on the inner side in the tire width direction to the pair of first regions,
the pair of first regions respectively having a width extending from the inner side in the tire width direction of the respective inner end portions of the pair of ply pieces to the outer side in the tire width direction of the respective inner end portions of the pair of ply pieces,
the width of each of the first regions being 5 mm or more and 30 mm or less,
a density of the ventilation holes in the pair of first regions is 100 or more and 300 or less per one square meter,
a density of the ventilation holes in the second region is 0 or more and 200 or less per one square meter, and
the density of the ventilation holes in the pair of first regions is higher than the density of the ventilation holes in the second region.

2. The pneumatic tire according to claim 1, wherein the density of the ventilation holes in the pair of first side portions is zero or more.

3. The pneumatic tire according to claim 1, wherein
a plurality of bleeder cords are disposed on a surface of the first ply and a surface of the second ply, each of the plurality of bleeder cords being composed of a plurality of fibers, and
a density of the plurality of bleeder cords disposed on the first ply is higher than a density of the plurality of bleeder cords disposed on the second ply.

4. The pneumatic tire according to claim 1, wherein the pair of first side portions has no ventilation holes.

5. The pneumatic tire according to claim 1, wherein the density of the ventilation holes in the second region is higher than the density of the ventilation holes in the pair of first side portions.

6. A pneumatic tire comprising:
a tread portion;
a pair of sidewall portions extending from both ends of the tread portion to an inner side in a tire radial direction;
a first ply including a central portion positioned on the inner side in the tire radial direction of the tread portion and a pair of first side portions, each of the pair of first side portions extending from respective ends of the central portion to the inner side in the tire radial direction and positioned on an inner side in a tire width direction of a respective one of the pair of sidewall portions; and
a discontinuous second ply including a pair of ply pieces, each of the ply pieces having an inner end portion that is disposed on an outer side in the tire radial direction of the central portion in the tread portion and a second side portion that extends from the inner end portion to the inner side in the tire radial direction and is positioned on an outer side in the tire width direction of one of the pair of first side portions, wherein
the first ply is provided with a plurality of ventilation holes,
a density of the ventilation holes in the central portion is higher than a density of the ventilation holes in the pair of first side portions, the central portion includes a pair of first regions respectively being adjacent on the inner side in the tire radial direction to respective inner end portions of the pair of ply pieces, a pair of second regions respectively being adjacent on the inner side in the tire width direction to the pair of first regions, and a third region adjacent on the inner side in the tire width direction to the pair of second regions, the pair of first regions respectively having a width extending from the inner side in the tire width direction of the respective inner end portions of the pair of ply pieces to the outer side in the tire width direction of the respective inner end portions of the pair of ply pieces, the width of each of the first regions being 5 mm or more and 30 mm or less, a density of the ventilation holes in the pair of first regions is 100 or more and 300 or less per one square meter, a density of the ventilation holes in the second region is 0 or more and 200 or less per one square meter, and the density of the ventilation holes is increasing in order of the pair of second regions, the third region, and the pair or first regions.

7. The pneumatic tire according to claim 6, wherein the density of the ventilation holes in the third region is 50 or more and 250 or less per one square meter.

8. The pneumatic tire according to claim 6, wherein the density of the ventilation holes in the pair of second regions is higher than the density of the ventilation holes in the pair of first side portions.

\* \* \* \* \*